(12) United States Patent
Harper et al.

(10) Patent No.: US 6,905,660 B2
(45) Date of Patent: Jun. 14, 2005

(54) PROCESS FOR LOADING A REACTOR

(75) Inventors: Jamie Stewart Harper, Scunthorpe (GB); Karl Barry Thew, Scunthorpe (GB)

(73) Assignee: Cat Tech, Inc., Pasadena, TX (US)

( * ) Notice: Subject to any disclaimer, the term of this patent is extended or adjusted under 35 U.S.C. 154(b) by 363 days.

(21) Appl. No.: 10/068,200

(22) Filed: Mar. 29, 2002

(65) Prior Publication Data

US 2002/0092147 A1 Jul. 18, 2002

Related U.S. Application Data

(62) Division of application No. 09/309,924, filed on May 11, 1999, now Pat. No. 6,409,977.

(30) Foreign Application Priority Data

May 12, 1998 (EP) ............................................. 98303681

(51) Int. Cl.⁷ .............................. B65B 1/00; B65B 1/04; B65B 1/06
(52) U.S. Cl. ........................ 422/232; 422/213; 422/216; 422/219; 141/236; 141/237; 141/238; 414/160
(58) Field of Search ................................ 422/196, 197, 422/211, 213, 216, 219, 232, 233, 145; 208/152; 141/236, 237, 238, 286; 198/390, 446, 565; 414/160, 587

(56) References Cited

U.S. PATENT DOCUMENTS

| 3,223,490 | A | * | 12/1965 | Sacken et al. | ............... | 422/219 |
| 3,788,370 | A | * | 1/1974 | Hare et al. | ................... | 141/125 |
| 3,829,983 | A | * | 8/1974 | White | .......................... | 34/583 |
| 3,913,806 | A | * | 10/1975 | Red, Jr. | ...................... | 222/429 |
| 3,956,435 | A | * | 5/1976 | Svensson et al. | ........... | 261/111 |
| 4,368,173 | A | * | 1/1983 | Jimenez et al. | ............. | 422/197 |
| 4,474,404 | A | * | 10/1984 | Hagenbuch | .............. | 296/182.1 |
| 5,607,893 | A | * | 3/1997 | Diekmann | .................. | 502/439 |

* cited by examiner

Primary Examiner—Alexa Doroshenk
(74) Attorney, Agent, or Firm—Moser, Patterson & Sheridan, L.L.P.

(57) ABSTRACT

There is provided a method for loading solid particles into a multi-tube reactor having an upper tube-sheet holding together the upper ends of the multitude of reactor tubes, the method comprising positioning a loading device having a plurality of holes on top of the upper tube-sheet such that the loading device rests on and substantially covers the upper tube-sheet and the holes correspond to the reactor tubes, the loading device comprising a plurality of adjacent polygonal plates, each polygonal plate having from 1 to 30 holes, each hole corresponding to one reactor tube; pouring the particles over the combined polygonal plates covering the tube-sheet; sweeping the particles through the holes in the plates into the respective reactor tubes; removing residual particles and any dust remaining on and between the plates; and removing the loading device.

7 Claims, 1 Drawing Sheet

PROCESS FOR LOADING A REACTOR

This application is a divisional of patent application Ser. No. 09/309,924, filed May 11, 1999, now U.S. Pat. No. 6,409,977.

FIELD OF THE INVENTION

This invention relates to a method of loading a multi-tube reactor with solid particles, in particular catalyst particles.

BACKGROUND OF THE INVENTION

A so-called multi-tube reactor is in essence a shell-and-tube exchanger containing up to several thousands or even tens of thousands of substantially vertical reactor tubes inside its shell, each reactor tube containing a fixed bed of catalyst particles and being cooled externally by a fluid circulating between the tubes in the shell. Multi-tube reactors are used for highly exothermic reactions, such as the epoxidation of ethylene. While the cross-sections of the reactor tubes are relatively small (such as 20–50 mm), their length is great (such as 1.5 to 20 m). Inside the reactor shell, the reactor tubes are held together by an upper and a lower tube sheet. Above the tube sheet, the reactor shell forms an upper dome in which maintenance work can be performed, such as the loading and re-loading of the reactor tubes with catalyst. In some reactors the upper dome is removable.

The loading or re-loading of the multitude of narrow and elongated reactor tubes with catalyst, the particles of which are generally not very much smaller than the inner diameter of the tubes, is difficult and time-consuming. An even distribution of the catalyst particles inside each tube and between all tubes is very important but difficult to achieve. During loading it is essential that the number of particles entering the reactor tube at the same time, multiplied by their greatest dimension, be small enough in relation to the internal diameter of the reactor tube so as to avoid the condition known as "bridging." "Bridging" occurs when several particles enter and fall down the tube simultaneously, wedge together part way down the tube and leave a void space below them—resulting in unevenly and incompletely loaded tubes. When loading the elongated reactor tubes described above, it is best to ensure that the particles enter these tubes one by one. A further requirement, in particular in the ethylene epoxidation reaction which involves gaseous reactants and which is very exothermic, is that a small upper portion of each reactor tube is kept free of catalyst.

In the past it was conventional to place, in effect, a funnel at the upper end of each reactor tube and pour the particles into the individual tubes. Such a procedure is unacceptable today because of the large number of tubes which have to be filled.

U.S. Pat. No. 3,223,490, issued 14 Dec. 1965, discloses a reactor tube loader which comprises (a) a perforated plate which rests on the reactor tubes, the perforations corresponding to the pattern and spacing of the reactor tubes; and (b) fill tubes, one for each reactor tube, which nest in the perforated plate and extend into the corresponding reactor tubes. In operation, catalyst is dumped onto the perforated plate and the plate is shaken by a vibrating mechanism, causing the catalyst particles to pass one by one through the fill tubes and into the reactor tubes. The same publication adds that the fill tubes may be made of such length that when they are loaded to their top with catalyst and then removed from the reactor tubes, their content fills the reactor tubes up to a predetermined point below the top thereof.

GB-B-2186209, issued 1 Feb. 1989, also discloses a reactor tube filling device consisting of a plate resting on the reactor tubes and fill tubes nesting in the plate and extending into the corresponding reactor tubes. The differences with the first document are that the fill tubes are firmly connected to the plate and that a vibrating mechanism is not mentioned. The function of the device according to this document is to ensure that all reactor tubes are filled to a fixed level below their top. The phenomenon of bridging is not mentioned.

The above catalyst loading devices have serious disadvantages. In particular, they are inflexible in that a plate and its associated filling tubes can only be used in a multi-tube reactor of the same size and shape, having the same number, pattern, spacing and diameter of reactor tubes. They are also big, heavy and cumbersome to transport and to introduce into the upper reactor dome.

It is an object of the present invention to provide a much simpler and more flexible loading system for multi-tube reactors. This object is achieved by using a multitude of discrete polygonal plates as defined below, to close-pack the upper tube sheet in a two-dimensional array, i.e. to entirely cover any shape and size of upper tube sheet, in the same way as tiles are used to cover a floor. Together, the polygonal plates form an exceedingly simple and flexible multi-tube loading device.

SUMMARY OF THE INVENTION

The present invention provides a loading device for distributing solid particles into a multi-tube reactor in which the reactor tubes are substantially vertical and held together by an upper and a lower tube sheet, the loading device comprising a plurality of adjacent polygonal, i.e. triangular, quadrangular or hexagonal, plates, each polygonal plate having from 1 to 30 holes, each hole corresponding to one reactor tube, each hole having an diameter not greater than 95% of the inner diameter of the reactor tube and not smaller than 1.1 times the greatest dimension of a single particle to be loaded, the polygonal plates also comprising fixing means for holding the holes in correspondence with the respective reactor tubes.

The present invention also provides a method for loading solid particles into a multi-tube reactor, the reactor tubes having an inner diameter of at least 2 times the diameter of a single particle to be loaded therein, the reactor having an upper tube-sheet holding together the upper ends of the multitude of reactor tubes, the method comprising the following steps:

a) positioning a loading device on top of the upper tube-sheet, such that the combined polygonal plates substantially cover the upper tube-sheet and their holes correspond to the reactor tubes, wherein the loading device comprises a plurality of adjacent polygonal plates, each polygonal plate having from 1 to 30 holes, each hole corresponding to one reactor tube, each hole having an diameter not greater than 95% of the inner diameter of the corresponding reactor tube and not smaller than 1.1 times the greatest dimension of a single particle to be loaded into said reactor tube, the polygonal plates also comprising fixing means for holding the holes in correspondence with the respective reactor tubes;

b) pouring the particles over the combined polygonal plates covering the tube-sheet;

c) sweeping the particles through the holes in the plates into the respective reactor tubes, whereby the particles fill the reactor tubes in a uniform manner and bridging is avoided;

d) removing residual particles and any dust remaining on and between the rims; and e) removing the loading device.

DETAILED DESCRIPTION OF THE INVENTION

Figure 1:
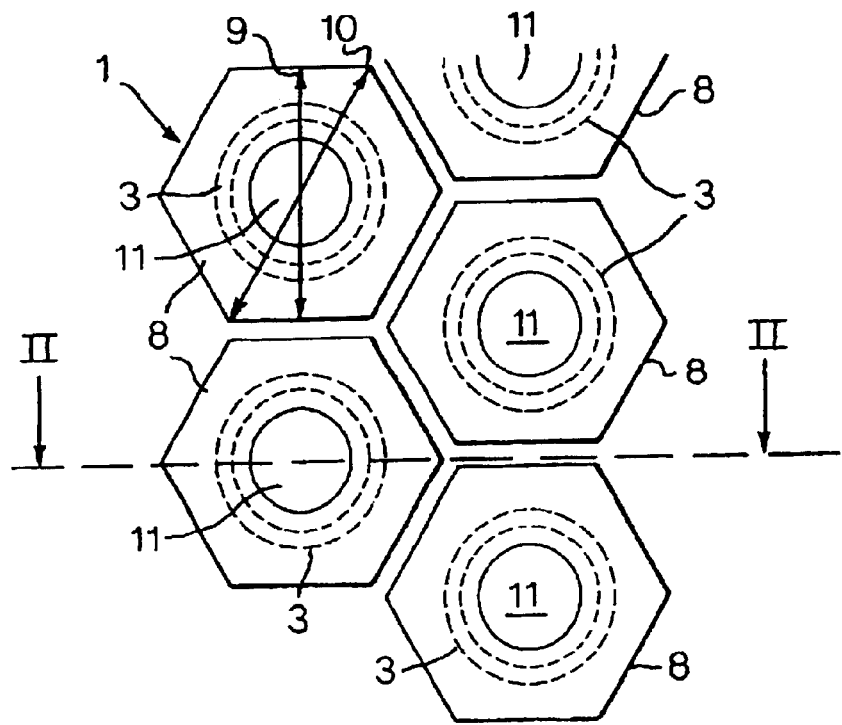
FIG. 1 shows schematically a top view of part of the loading device of the present invention in its embodiment according to the Example.

Each polygonal plate of the loading device according to the invention rests on the upper sheet of the multi-tube reactor with its hole or holes, the number of which is up to 30, corresponding to respective tops of reactor tubes and being kept in place by fixing means.

The inner diameter of a hole in the polygonal plate is chosen in relation to the particles to be handled, so as to ensure that bridging is avoided. In order to avoid bridging, the number of particles entering a reactor tube at any moment, multiplied by their greatest dimension, should be substantially less than the inner diameter of the reactor tube. In practice, the particles enter the reactor tube one by one. Broadly, the inner diameter of a hole is not greater than 95% of the inner diameter of the reactor tube and not smaller than 1.1 times the greatest dimension of the particles to be loaded, but more suitably it is from 1.2–2.0 times the greatest dimension of these particles.

The fixing means for holding the hole or holes in correspondence with the respective reactor tube or tubes can in principle be chosen to be individual to each hole or common to the entire device. There are many more or less simple possibilities to effect this means. Of course, the simpler the fixing means the easier the operation will be and for that reason screws and bolts are not preferred. Suitably, the fixing means is an insert extending from the edge of the hole into the top of the reactor tube and having a length of from 0.5 cm to 1.5 meter. The form of such an insert can be anything from at least one spike to a complete pipe, including intermediate forms such as a half-pipe.

Preferably, the fixing means is an insert in the form of a pipe or half-pipe having the same or a smaller inner diameter than the hole in the plate and extending from its edge into the reactor tube. Of course the longer this insert is the slower will be the filling and the greater the void remaining in the upper part of the tube when the insert is retracted. Preferably the length of the insert is from 2 to 100 cm, more preferably from 2 to 50 cm. Most preferably the length of the insert is from 1.1–1.5 times the depth of the upper part of the reactor tube which, when loaded, is to be kept free of particles.

When the insert is long, it is advantageously made of flexible material or in extensible form.

When the insert is in the form of a pipe, it may be tapered in downward direction and/or provided with a longitudinal compression slot.

The polygonal plate of the loading device according to the invention has a triangular, quadrangular or hexagonal shape. Its dimensions are such as to ensure that when in place it will not interfere with neighbouring reactor tube openings. Preferably the dimensions of the polygonal plate are such that when in place the distance between neighbouring upper rims is smaller than the greatest dimension of the particles to be loaded, thus ensuring that no particles will be captured between plates. On the other hand a small inter-plate space is convenient for ease of handling and for accommodating the dust which inevitably develops during the loading work, thus avoiding that the dust is swept into the reactor pipes. The triangular, quadrangular or hexagonal shape of the polygonal plate ensures that the inter-plate spaces will always be uniform.

In profile, the polygonal plate may be undercut in its downward surface, so as to allow even more space for accommodating the dust. Alternatively the insert extending from the polygonal plate into the reactor tube can be made to carry a shoulder which will also allow space between the polygonal plate and the upper tube sheet for accommodating dust. The length of the shoulder can suitably be about 1 cm. For the same purpose of accommodating dust, the polygonal plate can be perforated with slits or small holes. The polygonal plate may also taper in its upward surface towards the hole or holes, in order to facilitate the particles' falling into the reactor tube.

The simplest and most preferred embodiment of the loading device according to the invention is when it consists of a multitude of polygonal plates, each having a single hole to correspond with one reactor tube, and fixing means as described above. In that case the preferred shape of the polygonal plate is hexagonal, square, rhomboid or diamond-shaped. When a polygonal plate carrying multiple holes is used, its shape can most conveniently be rectangular, e.g. in the form of a strip carrying one or more rows of inserts. Such a strip can be made flexible, for greater ease of transport and handling.

The loading device according to the invention can be made of any convenient material, preferably one that is robust enough to allow for reusing the loading device. Examples are metals such as stainless steel and aluminium, and polymers such as polypropylene and polyvinyl chloride.

In operating the loading device according to the invention, the polygonal plates are first placed in position over the upper tube sheet such that all reactor tubes correspond at their upper ends to holes in the plates and the combined plates substantially cover the tube sheet in part or entirely. Then the particles are poured over the surface of the combined plates. Next, the particles are forced through the holes and into the reactor tubes by sweeping. The sweeping can be done manually, e.g. with simple brooms. Alternatively, a sweeping mechanism can be used, such as a mechanically operated central axis from which a rotating arm extends which carries a sweeping element, preferably along its entire length. However, the actual manner of sweeping is not essential to operating the invention because the loading device itself ensures a quick and relatively convenient uniform loading of all reactor tubes. As indicated above, when the polygonal plates carry inserts the length and calibre of the insert, in relation to the calibre of the reactor tube, will determine the depth of the upper end of the reactor tube which will remain empty after the insert is removed.

The invention will be further illustrated by the following Example and Figures.

EXAMPLE

Four chemical reactors, each comprising about 3000 vertical reactor pipes, each reactor pipe having an outer diameter of 45.2 mm, an inner diameter of 39.2 mm, and a length of 12.8 m, the distance between neighbouring pipes being 63 mm, were loaded with catalyst particles having the basic shape of a cylinder with a diameter of 8 mm and a length of 8 mm.

Loading devices were used, each of which was made of polypropylene and consisted of a multitude of hexagonal plates. Each hexagonal plate was 59.0 mm across the minor axis and 69.0 mm across the major axis, with a thickness of 5.0 mm, and had a single central hole of 23.8 mm (15/16 inches) in diameter, and a slotted insert extending at a right angle from the edge of the hole. Each insert was in the form of a tapered pipe 30.0 mm in length, 39.0 mm outside diameter, 35.0 mm inside diameter tapering to 38.0 mm outside diameter and 35.0 mm inside diameter, and had a compression slot 3 mm wide extending the full length of 30 mm, allowing a tight fit.

In operation each hexagonal plate device was positioned manually with its insert extending into one of the reactor pipes to be loaded. The reactor pipes which did not require loading were plugged with a plastic cap. The configuration ensured that the whole tubesheet was effectively covered excepting regular gaps of 3 mm width left between neighbouring loading devices.

The reactor was covered in strips of rubber sheeting, each about 80 cm wide and of sufficient length to extend from one side of the reactor to the other, the maximum length being 450 cm, to prevent any foreign objects falling through an orifice into the reactor pipe. The reactor was loaded in sections, with each section being exposed by the removal of a strip of rubber sheeting. The loading was performed methodically in that the loading of one section was completed before the loading of a subsequent section was started.

The catalyst was tipped from drums each of which contained about 200 liters of catalyst into a loading hopper. The outlet of the hopper had a tube of canvas, of 203 mm diameter, through which the catalyst poured. The tube of canvas had a dust removal device attached to minimise the dust reaching the loading devices. The catalyst was poured on to the first section and manoeuvred over the orifices by hand. As the catalyst particles moved attrition caused some dust generation. The gap between the loading devices served as a dust catchment area.

The gap was sufficiently small as not to allow any whole catalyst particles to enter, but allow small chips and broken pieces of catalyst.

The hexagonal plates were removed manually. In order to avoid damage by pulling on the holes of the hexagonal plates, a Y-shaped manual removal tool was designed and used to operate on the hexagonal plate edges.

After removal of the loading device, the catalyst level in each reactor tube dropped below the level of the tubesheet. Vacuum was then used to further evacuate catalyst particles from the top of each reactor pipe to a level of about 305 mm (12 inches) below the tube sheet.

A dP-check (pressure drop over the reactor pipes) was performed by passing a constant flow of dry oil-free air through each tube and determining the pressure drop generated over a restricted orifice plate (ROP). Typical for a good catalyst distribution is a dP in each tube of within ±2.5% of the mean. The dP-check showed that an even distribution of catalyst particles inside each reactor pipe as well as among individual pipes has been achieved and that no pipes required unloading and refilling.

Figure 2:
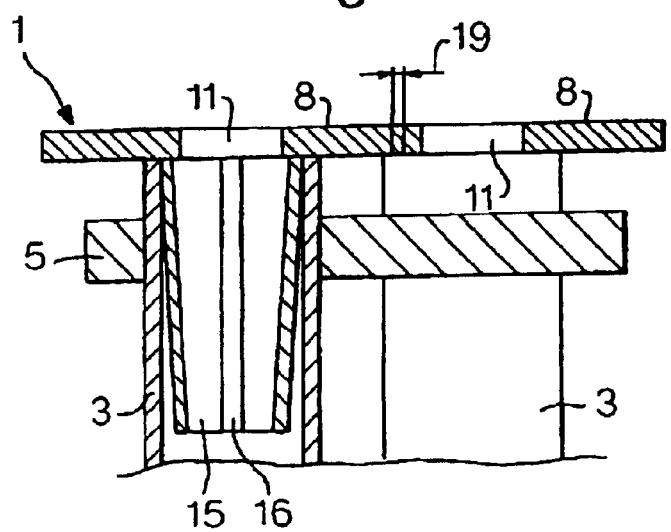
FIG. 2 shows a section of FIG. 1 along the line II—II.

Referring to FIGS. 1 and 2, during normal operation, the loading device 1 is arranged in a substantially vertical multi-tube reactor (not shown) which comprises a plurality of reactor tubes 3 which are held together by an upper tube sheet 5 and a lower tube sheet (not shown). The loading device 1 is arranged to cover at least part of the upper tube sheet 5.

The loading device 1 comprises a plurality of adjacent polygonal plates 8. In the embodiment shown, the polygonal plates 8 are hexagonal, each having a minor axis 9 and a major axis 10 and each having a single hole 11.

Each hole 11 corresponds to one reactor tube 3, that is to say each hole is arranged above the corresponding reactor tube 3. To hold the hole 11 in correspondence with the respective reactor tube, each hexagonal plate 8 further comprises fixing means for holding the hole 11. In the embodiment as shown in FIG. 2, the fixing means is a tapered pipe 15 provided with a compression slot 16.

Suitably the distance 19 between neighbouring hexagonal plates 8 is smaller than the largest dimension of a single particle (not shown) to be loaded.

We claim:

1. A method for loading solid particles into a multi-tube reactor, reactor tubes of the reactor having an inner diameter of at least 2 times the diameter of a single particle to be loaded therein, the reactor having an upper tube-sheet holding together the upper ends of the multitude of reactor tubes, the method comprising the following steps:
    a) positioning a loading device having a plurality of holes on top of the upper tube-sheet such that the loading device rests on and substantially covers the upper tube-sheet and the holes correspond to the reactor tubes, said loading device comprising a plurality of adjacent polygonal plates, each polygonal plate having from 1 to 30 holes, each hole corresponding to one reactor tube, each hole having a diameter not greater than 95% of the inner diameter of its corresponding reactor tube and not smaller than 1.1 times the greatest dimension of a single particle to be loaded into said corresponding reactor tube, the polygonal plates also comprising means for holding the holes in correspondence with the respective reactor tubes, and wherein each plate is displaced from adjacent plates by an inter-plate spacing having a width not greater than the smallest dimension of a single particle to be loaded into said reactor, said inter-plate spacing for collecting dust and partial particles;
    b) pouring the particles over the combined polygonal plates covering the tube-sheet;
    c) sweeping the particles through the holes in the plates into the respective reactor tube, whereby the particles fill the reactor tubes in a uniform manner and bridging is avoided;
    d) removing residual particles and any dust remaining on the plates and in the inter-plate spacing; and
    e) removing the loading device.

2. The method according to claim 1, wherein step c) is performed by a sweeping mechanism, comprising a sweeping element connected to an arm, the arm rotating around a central axis.

3. A method for loading solid particles into a multi-tube reactor, comprising:
    a) positioning a plurality of discrete plates on top of an upper tube-sheet of the multi-tube reactor, whereby the plates rest on and substantially cover at least a portion of the upper tube-sheet and provide a spacing between adjacent plates having a width not greater than the smallest dimension of a single particle to be loaded into the multi-tube reactor, the spacing for collecting dust and partial particles, wherein each plate comprises:
        an aperture that corresponds to a corresponding reactor tube and has a diameter not greater than 95% of the inner diameter of the corresponding reactor tube and not smaller than 1.1 times the greatest dimension of a single particle to be loaded into the corresponding reactor tube; and means for holding the aperture in correspondence with the corresponding reactor tube;

b) pouring the particles over at least a portion of the plurality of plates covering the tube-sheet;

c) sweeping the particles through the apertures in the plates into the corresponding reactor tubes, whereby the particles fill the reactor tubes in a uniform manner and bridging is avoided;

d) removing residual particles and any dust remaining on the plates and in the spacing between adjacent plates; and e) removing the plurality of plates.

4. A method for loading solid particles into a multi-tube reactor, comprising:

a) positioning a plurality of discrete plates on top of an upper tube-sheet of the multi-tube reactor, whereby the plates substantially cover at least a portion of the upper tube-sheet and each plate has a shape that provides a spacing between adjacent plates having a width not greater than the smallest dimension of a single particle to be loaded into the multi-tube reactor, the spacing for collecting dust and partial particles;

b) pouring the particles over at least a portion of the plurality of plates covering the tube-sheet;

c) sweeping the particles through apertures in the plates into reactor tubes of the multi-tube reactor, whereby a size of the apertures is selected for filling the reactor tubes with the particles in a uniform manner and avoiding bridging;

d) removing residual particles and any dust remaining on the plates and in the spacing between adjacent plates; and e) removing the plurality of plates.

5. The method of claim 4, wherein the positioning the plurality of plates comprises inserting fixing means of the plates into a top of reactor tubes of the multi-tube reactor to provide for alignment of apertures in the plates with corresponding reactor tubes.

6. The method of claim 4, wherein the sweeping the particles is performed mechanically.

7. The method of claim 4, wherein the sweeping the particles is performed manually.

* * * * *